J. H. CRISPELL.
Boring Hubs.

No. 155,501.

Patented Sept. 29, 1874.

UNITED STATES PATENT OFFICE.

JOHN H. CRISPELL, OF ONEIDA, NEW YORK.

IMPROVEMENT IN BORING HUBS.

Specification forming part of Letters Patent No. 155,501, dated September 29, 1874; application filed March 17, 1874.

*To all whom it may concern:*

Be it known that I, JOHN H. CRISPELL, of Oneida, in the county of Madison and State of New York, have invented an Improvement in Boring Hubs, of which the following is a specification:

The object of the invention is to facilitate the boring out of wheel-hubs absolutely true and concentric with the rim for the insertion of the axle-boxes. The invention consists in a frame of peculiar construction for the support of the boring-bar, with provision for clamping it to the fellies, and for its adjustment relatively to the rim to insure the centering and truing of the bore to the rim.

Figure 1:
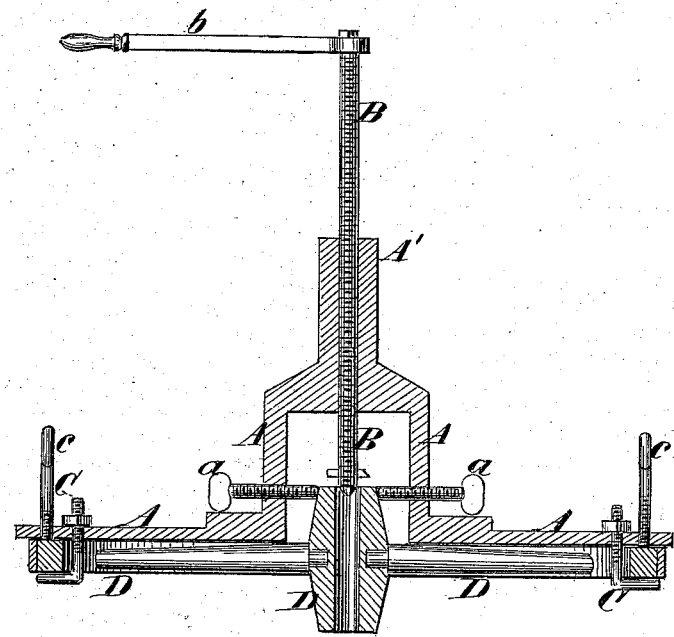
Figure 2:
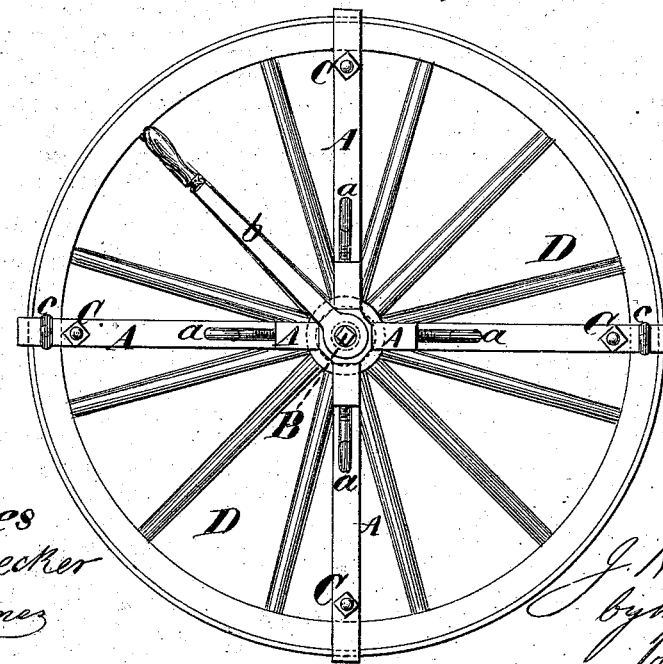

In the accompanying drawing, Figure 1 is a central vertical section of the machine clamped to the wheel, also in section. Fig. 2 is a plan view of the machine and wheel in position for boring.

The frame of the machine consists of several bent arms, A A A, carrying a perpendicular central socket, A', or guide-bearing, containing a female screw. The arms are bent in such form (as shown in Fig. 1) as to receive the hub between them below the socket A'. The boring-bar B is provided with a screw-thread on its exterior, which is fitted into the female screw in the socket A' or guide-bearing. To the lower part of the said bar is secured the boring-cutter, while to the upper end the lever $b$ is fastened, for the purpose of turning the bar and feeding the cutter to the hub of the wheel. The arms A A A A, containing the set-screws $a\ a\ a\ a$, are bent downward and form the guide-bearing, in such a manner as to allow of hubs of different sizes to be placed between them. Their lower parts are bent at right angles to the boring-bar, and are made long enough to extend over the rims of different-sized wheels. The bases or soles of the arms are faced off so as to lie in one plane. The arms A A A A are provided, near their ends, with adjustable clamps C C, which, extending downward and projecting over the under side of the fellies, serve the purpose of drawing and fastening the wheel of the arms of the machine. The arms may be provided with marks concentric to the center of the boring-bar. The set screws $c\ c$, still nearer to the ends of the arms, serve the purpose of exactly adjusting the fellies of a wheel in a plane and of bringing the boring-bar perpendicular to the plane of the wheel, that the hub may be bored truly with the rim.

To prepare for boring, the wheel is laid down horizontally and the arms A A laid upon it, and the boring-bar is brought concentric to the rim by adjusting the set-screws $a\ a$, and also brought perpendicular to the plane of the wheel by the screws $c\ c$. The clamps C C and screws $a\ a$ are then screwed up tightly and the boring proceeded with by turning the boring-bar by means of the handle.

I am aware that it is not new to arrange the boring-bar in an internally screw-threaded socket, carrying short arms in which are arranged the clamps for confining the spokes of the wheel in place, a traversing tram or guide serving to indicate when the borer is at right angles to the plane of the felly, and such I disclaim. The principal feature of my invention consists in the provision for supporting the rim of the wheel. This is secured by forming the internally screw-threaded socket carrying the boring-bar with a series of radial arms at right angles to the said socket, and providing their outer extremities with adjustable clamps and set-screws, for confining in place and supporting the rim or felly of the wheel. By this construction of frame I insure the centering and truing of the bore concentric with the rim of the wheel.

I claim—

The series of radial arms A A, formed with and bent at right angles to the internally screw-threaded socket A', and carrying at their outer extremities the adjustable clamps C C and set-screws $c\ c$, for confining and supporting the rim of the wheel, in combination with the boring-bar B and set-screws $a\ a$, all being constructed and arranged as herein shown and described.

JOHN H. CRISPELL.

Witnesses:
C. CARSKADDAN,
W. W. BROWNSON.